(12) United States Patent
Ko

(10) Patent No.: US 9,506,489 B2
(45) Date of Patent: Nov. 29, 2016

(54) CONNECTORS USED IN MODULAR FURNITURE SYSTEM

(71) Applicant: Kenneth H. Ko, Los Angeles, CA (US)

(72) Inventor: Kenneth H. Ko, Los Angeles, CA (US)

(*) Notice: Subject to any disclaimer, the term of this patent is extended or adjusted under 35 U.S.C. 154(b) by 711 days.

(21) Appl. No.: 13/941,126

(22) Filed: Jul. 12, 2013

(65) Prior Publication Data

US 2014/0161518 A1 Jun. 12, 2014

Related U.S. Application Data

(60) Provisional application No. 61/671,690, filed on Jul. 14, 2012, provisional application No. 61/800,459, filed on Mar. 15, 2013.

(51) Int. Cl.
*F16B 12/24* (2006.01)
*A47B 87/02* (2006.01)

(52) U.S. Cl.
CPC ............ *F16B 12/24* (2013.01); *A47B 87/02* (2013.01); *Y10T 29/4995* (2015.01); *Y10T 403/7045* (2015.01)

(58) Field of Classification Search
CPC ............ A47B 2230/0074; A47B 2230/0077; A47B 2230/0081; A47B 2230/0085; A47B 2230/0092; A47B 2230/07; F16B 2012/046; F16B 12/125; Y10T 403/7015; Y10T 403/7094
See application file for complete search history.

(56) References Cited

U.S. PATENT DOCUMENTS

| | | | |
|---|---|---|---|
| 3,944,282 A | 3/1976 | Nakamura | |
| 4,900,090 A * | 2/1990 | Davis | A47C 5/12 297/440.1 |
| 4,995,176 A * | 2/1991 | Briscoe | E02F 3/8152 172/751 |
| 6,612,078 B2 * | 9/2003 | Hawang | A47B 47/042 403/353 |
| 6,830,236 B2 * | 12/2004 | Augusto de Lorenzo | E01F 13/028 256/1 |
| 6,877,824 B2 | 4/2005 | Winkless | |
| 7,152,752 B2 | 12/2006 | Kurtenbach | |
| 8,464,408 B2 | 6/2013 | Hazzard | |
| 2007/0145864 A1 | 6/2007 | Freedman | |
| 2010/0254757 A1 * | 10/2010 | Saul | A47C 4/02 403/404 |
| 2011/0085853 A1 * | 4/2011 | Liu | F16B 12/125 403/381 |

* cited by examiner

*Primary Examiner* — Michael P Ferguson
(74) *Attorney, Agent, or Firm* — Chen Yoshimura LLP

(57) ABSTRACT

A connector for connecting two furniture modules or other stationary objects to form a modular system. The connector includes two hardware pieces, to be mounted onto two furniture modules, respectively. The first piece fits into the second piece in a loading/unloading position, and then moves to a locked position where prongs of the first piece are dovetailed with slots of the second piece. A detent on one hardware piece and a track in the other hardware piece are provided to help the first piece stay in the locked position, but to allow the first piece to move out of the locked position into the loading/unloading position when sufficient force is applied. A furniture unit formed by joining multiple modules using the connector can safely withstand reasonable outside forces in various directions without shifting or separating. The system also allows for easy and intuitive unlocking/dismounting to separate the two modules.

15 Claims, 6 Drawing Sheets

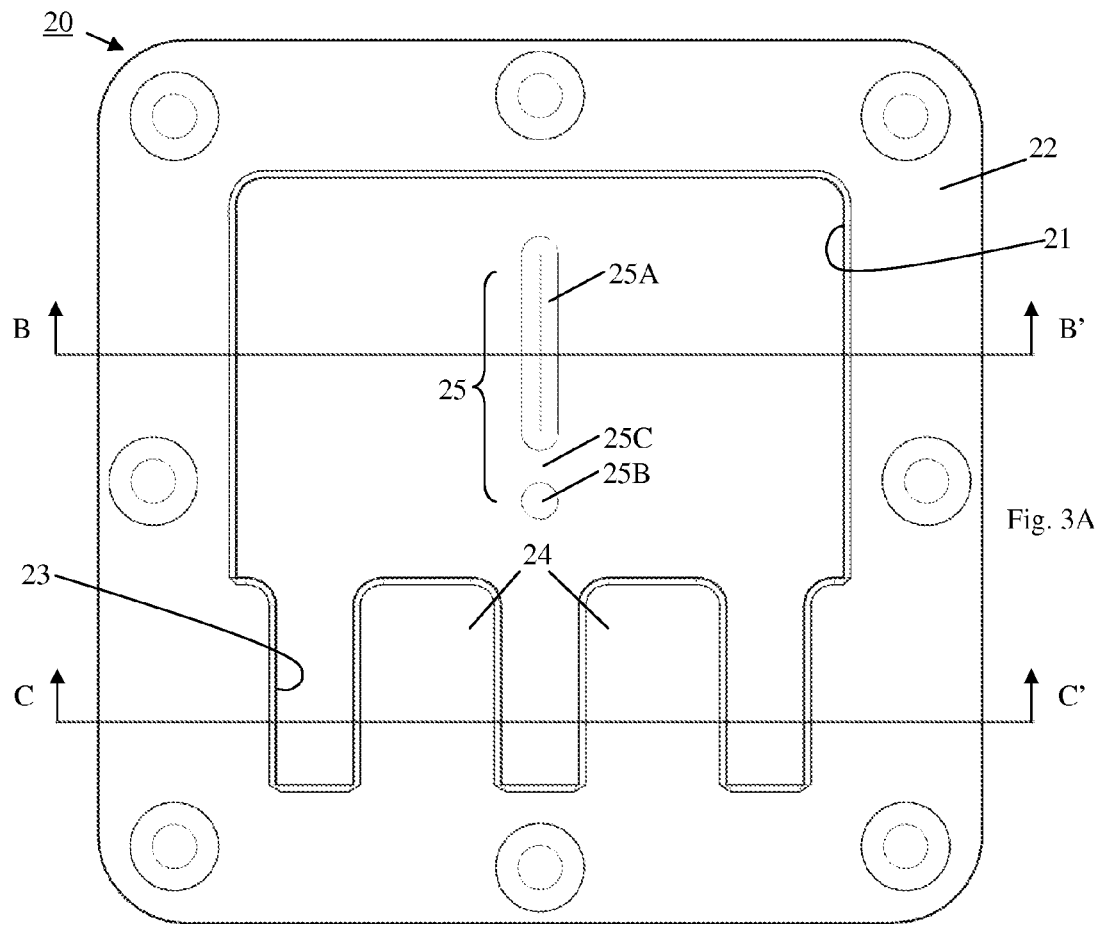
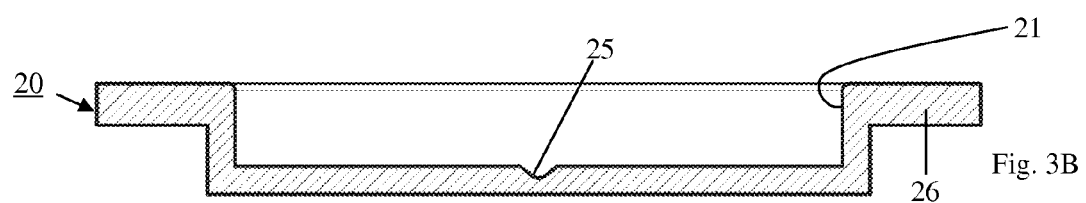
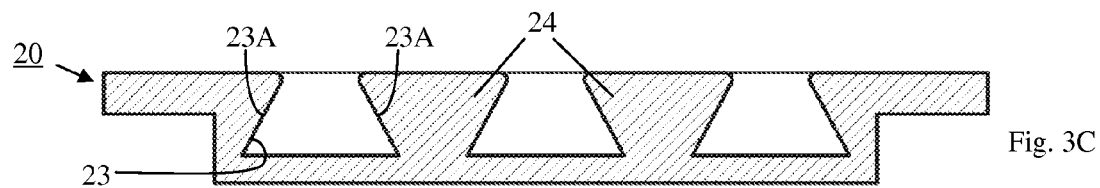

CONNECTORS USED IN MODULAR FURNITURE SYSTEM

This application claims priority under 35 USC §119(e) from U.S. Provisional Patent Application No. 61/671,690, filed Jul. 14, 2012, and U.S. Provisional Patent Application No. 61/800,459, filed Mar. 15, 2013, which are herein incorporated by reference in their entireties.

BACKGROUND OF THE INVENTION

Field of the Invention

This invention relates to furniture, and in particular, it relates to modular furniture systems and connectors useful in modular furniture systems.

Description of the Related Art

Modular furniture systems have the advantages that they can enable furniture users to rearrange parts of the furniture system (flexibility in aesthetics), to recycle certain parts of old furniture and to purchase more precisely what is necessary for each individual living situation at each given moment. Furniture built from combining individual modules creates more available possibilities both aesthetically and functionally, for furniture users given a fixed amount of material. Modular systems also have added value as they can accommodate different materials, including all the common furniture building materials such as, but not limited to wood, particleboard, glass, MDF & various metals (steel, iron, etc.). Many modular furniture systems have been known in the art. Some examples include systems described in U.S. Pat. Nos. 7,152,752, 6,877,824, 3,944,282, and 8,464,408, and U.S. Pat. Appl. Pub. No. 2007/0145864.

SUMMARY OF THE INVENTION

The present invention is directed to a connector device for modular furniture system that substantially obviates one or more of the problems due to limitations and disadvantages of the related art.

An object of the present invention is to provide a modular furniture system and connectors used in such a system that is intuitive for the user, easy to understand, and straight forward and safe to own and operate on an ongoing basis. Another object of the present invention is to provide connectors for modular furniture systems that are simple for furniture designers and manufacturers to adopt in their efforts to maximize end value for the user while minimizing cost of production.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

In one aspect, the present invention provides a set of two pieces of hardware that enables a user to join and securely fasten two pieces of furniture to form one furniture unit; the two pieces of hardware have a loading/unloading state where the two pieces of furniture cannot be separated, a locked state where the two pieces of furniture can be easily separated, and an intuitive transition between the two states. The hardware guides transition from the loading/unloading state to the locked state. In its locked state, the hardware joins two furniture modules so that when outside force is applied horizontally or vertically to any part of the resulting singular unit, the modules do not separate.

To achieve these and other advantages and in accordance with the purpose of the present invention, as embodied and broadly described, the present invention provides a connector for joining two furniture modules or other objects, which includes: a first hardware piece; a second hardware piece having a main cavity for receiving the first hardware piece, wherein the first and second hardware pieces are in a loading/unloading state when the first hardware piece is received in the main cavity of the second hardware piece, the second hardware piece further having one or more receiving cavities connected to the main cavity for receiving at least a portion of the first hardware piece, wherein the first and second hardware pieces are in a locked state when the portion of the first hardware piece is received in the one or more receiving cavities of the second hardware piece, and wherein the first hardware piece is slidable within the second hardware piece to change between the loading/unloading state and the locked state; and a detent mechanism, including a first part disposed on the first hardware piece and a second part disposed on the second hardware piece, wherein the first and second parts of the detent mechanism engage with and cooperate with each other to hold the first and second hardware pieces in the locked state, and to allow the first and second hardware pieces to change from the locked state to the loading/unloading when a sufficient force is applied.

In another aspect, the present invention provides a method for joining two furniture modules together, which includes: obtaining a first furniture module and a second furniture module; obtaining a connector including a first hardware piece and a second hardware piece which are separate from the first and second furniture modules, the second hardware piece having a main cavity for receiving the first hardware piece; mounting the first hardware piece on a surface of the first furniture module; mounting the second hardware piece on a surface of the second furniture module; positioning the first and second furniture modules so that the first hardware piece mounted on the first furniture module is received in the main cavity of the second hardware piece mounted on the second furniture module, the first and second hardware pieces being in a loading/unloading state; and moving the first and second furniture modules relative to each other in a first direction, wherein the first and second hardware pieces are moved from the loading/unloading state to a locked state where the first and second hardware pieces engage with each other to prevent the first and second furniture modules from separating in a direction perpendicular to the first direction.

In another aspect, the present invention provides a modular furniture system, which includes: a first furniture module; a second furniture module; a first hardware piece mounted on a surface of the first furniture module and protruding from the surface of the first furniture module; and a second hardware piece mounted on a surface of the second furniture module, the second hardware piece being disposed in a cavity on the surface of the second furniture module, the second hardware piece having one or more cavities for receiving the first hardware piece, wherein the surface of the first hardware module is in contact with the surface of the second furniture module, wherein the first hardware piece is located within the cavities of the second hardware piece, and wherein the first and second hardware pieces engage with each other in a locked state to prevent the first and second furniture modules from separating in a direction perpendicular to the surface of the first furniture module and the surface of the second furniture module, wherein the first and second hardware pieces moveable from the locked state to a loading/unloading state by moving the first and second furniture modules relative to each other, and wherein in the loading/ unloading state, the first and second hardware pieces allow the first and second furniture modules to separate in the direction perpendicular to the surface of the first furniture module and the surface of the second furniture module.

It is to be understood that both the foregoing general description and the following detailed description are exemplary and explanatory and are intended to provide further explanation of the invention as claimed.

BRIEF DESCRIPTION OF THE DRAWINGS

FIG. 1A shows the two hardware pieces in an unassembled state; FIG. 1B shows them in a loading/ unloading state; and FIG. 1C shows them in a locked state.

FIG. 2A is a top plan view; FIGS. 2B and 2C are side cut-away views taken in planes indicated by lines B-B' and C-C' in FIG. 2A, respectively; and FIG. 2D is a side view from the right side of FIG. 2A.

FIGS. 3A-3C illustrate the structure of the second hardware piece of the connector. FIG. 3A is a top view, and FIGS. 3B and 3C are side cut-away views taken in planes indicated by lines B-B' and C-C' in FIG. 3A, respectively.

FIG. 4A shows the two hardware pieces in the unassembled state; FIG. 4B shows them in the loading/ unloading state; and FIG. 4C shows them in the locked state.

DETAILED DESCRIPTION OF THE PREFERRED EMBODIMENTS

In modular furniture systems, it is important to achieve the advantages of being modular without compromising many features of traditional furniture including its functionality and its ability to withstand reasonable levels of outside force from various directions through every day interaction. It is also important to have flexibility for a designer to straightforwardly achieve a wide range of designs to appeal to different aesthetic preferences.

Embodiments of the present invention provide connectors that can be used to join furniture pieces or modules together to form modular furniture systems. The connectors are a set of hardware including two separate pieces intended to be securely affixed, for example using screws, to the bottom panel or frame of one piece of furniture and the top panel or frame of another separate piece of furniture, respectively.

These two hardware pieces are designed to fit into each other, first, in a semi secure, but stable loading/unloading state for the user to mount and dismount the two modules of furniture he/she intends to join. Then, the hardware has a path that guides the user's movements to bring the two pieces of furniture to a state where it can be locked into a secure, final position for use as one unit of furniture having multiple parts. For example, the unit of furniture may be a single storage unit made of two shelves joined together by the connector hardware instead of two separate standalone shelves.

Figure 1A:
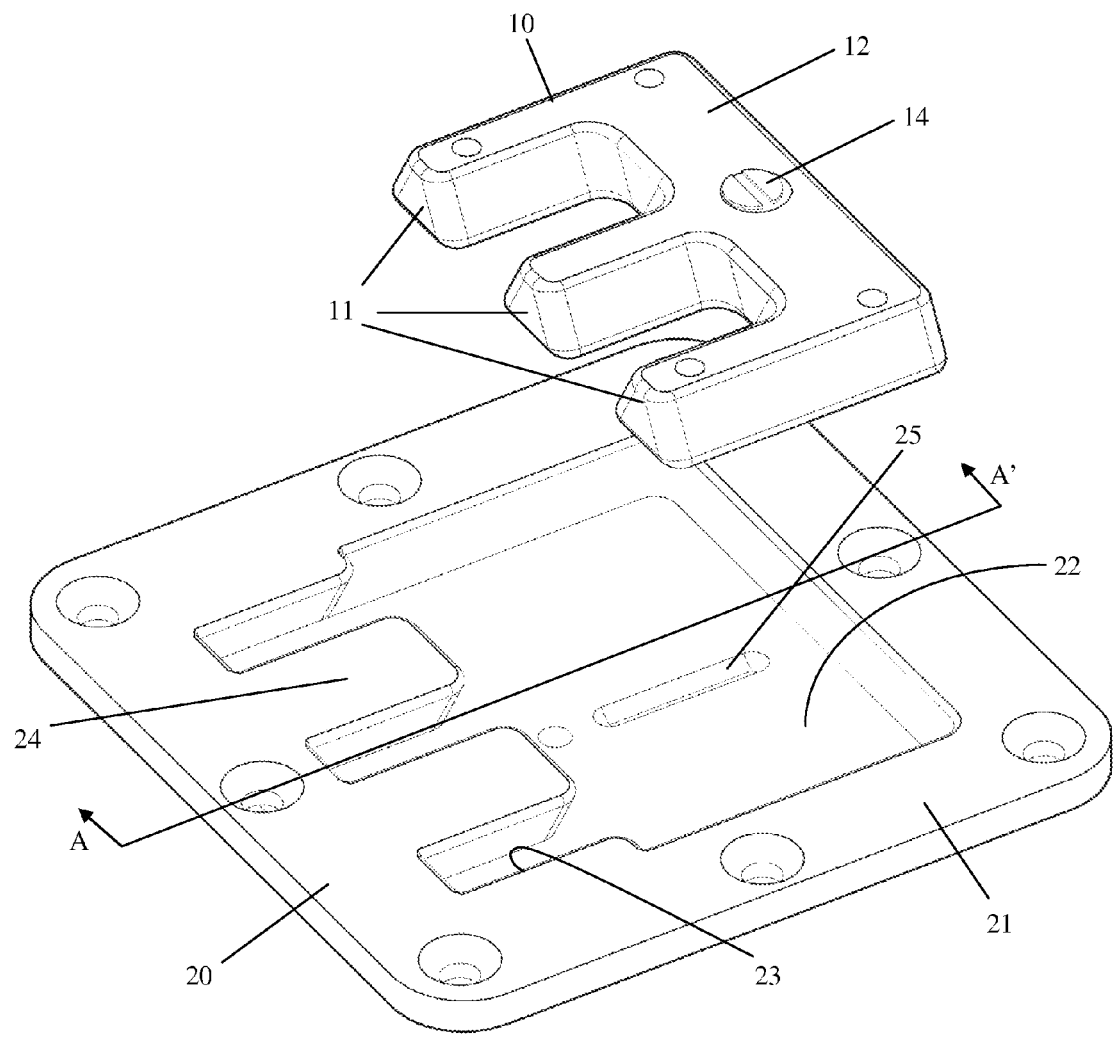
FIGS. 1A-1C are perspective views of the two hardware pieces of the connector according to embodiments of the present invention.
Figure 1B:
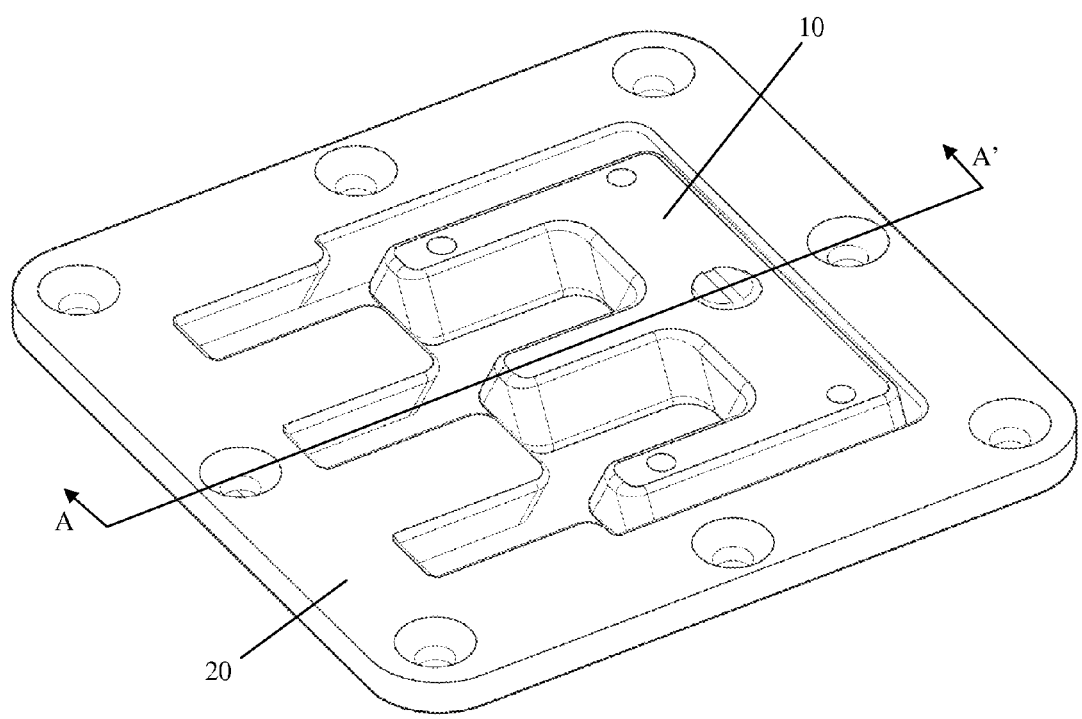
Figure 1C:
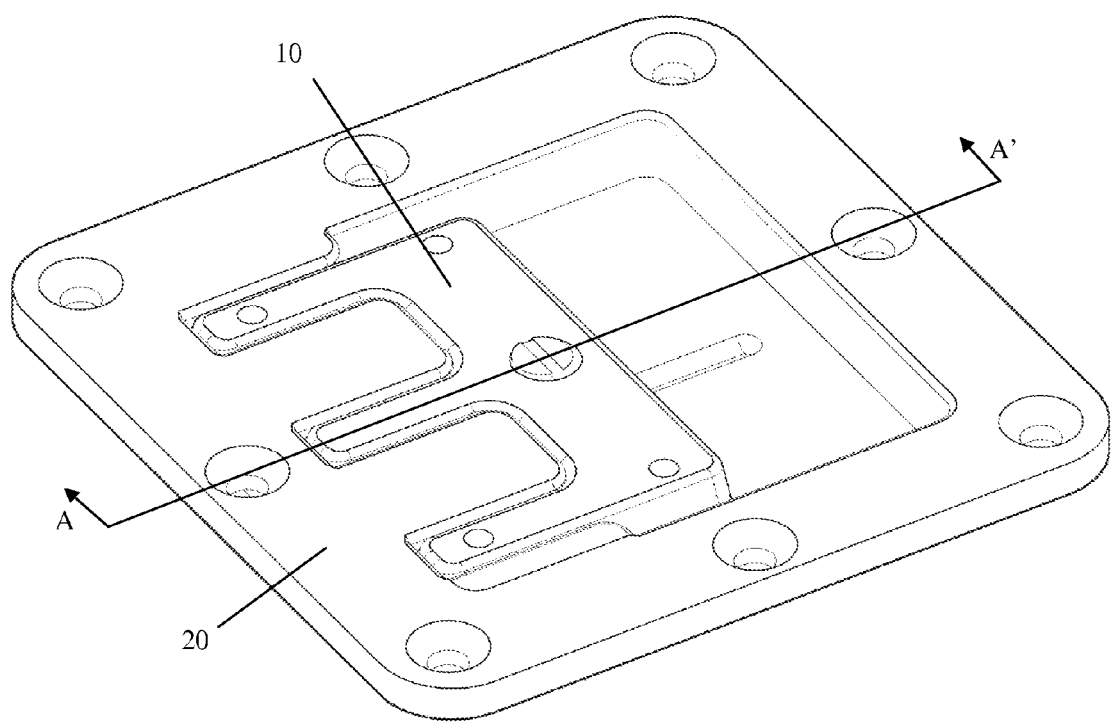
Figure 4A:
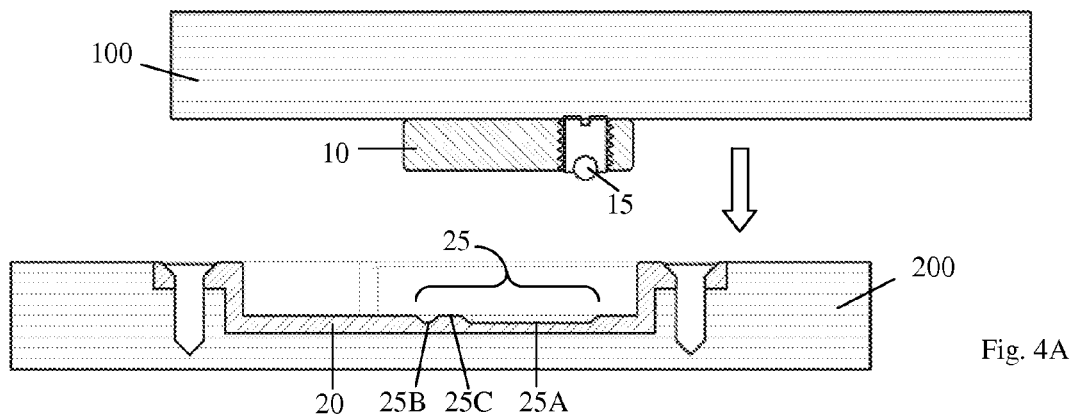
FIGS. 4A-4C are side cross-sectional views of the two hardware pieces of the connector with the furniture modules to be joined.
Figure 4B:
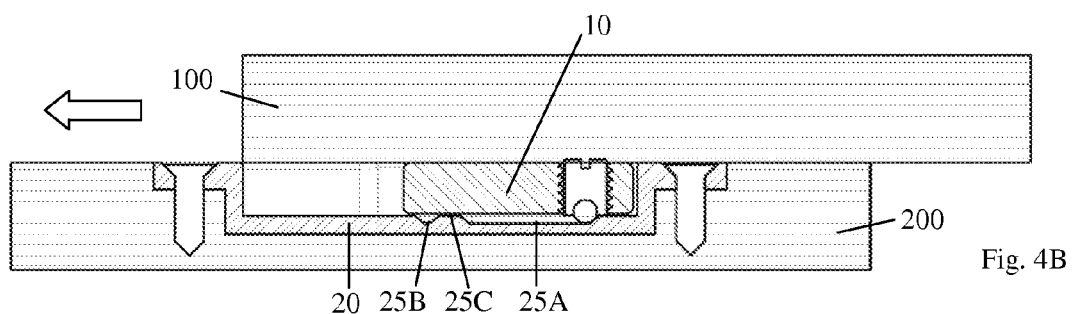
Figure 4C:
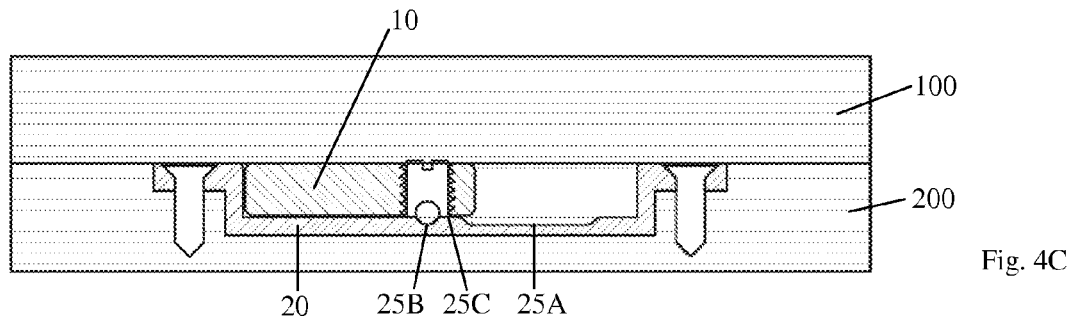

An embodiment of the present invention is described in detail with reference to FIGS. 1A-4C. As shown in FIGS. 1A-1C, the connector hardware includes two pieces 10 and 20. The first piece of hardware 10 is intended to be affixed to and protrude downwardly from the bottom face of the top furniture module, and the second piece of hardware 20 is intended to be affixed to the top of the bottom furniture module. This is also illustrated in FIG. 4A-4C, showing two furniture modules 100 and 200. As shown in FIG. 4A-4C, the second hardware piece 20 is entirely embedded into the top panel of the bottom furniture module 200, so that the top surface of the hardware piece 20 is flush with the top surface of the bottom furniture module. To this end, a cavity is cut into the frame module, preferably having a shape that matches the shape of the second hardware piece 20.

Note that the top and bottom orientations may be reversed; in other words, the second hardware piece 20 may be affixed to the top furniture module and the first hardware piece 10 may be affixed to the bottom furniture module.

Figure 2A:
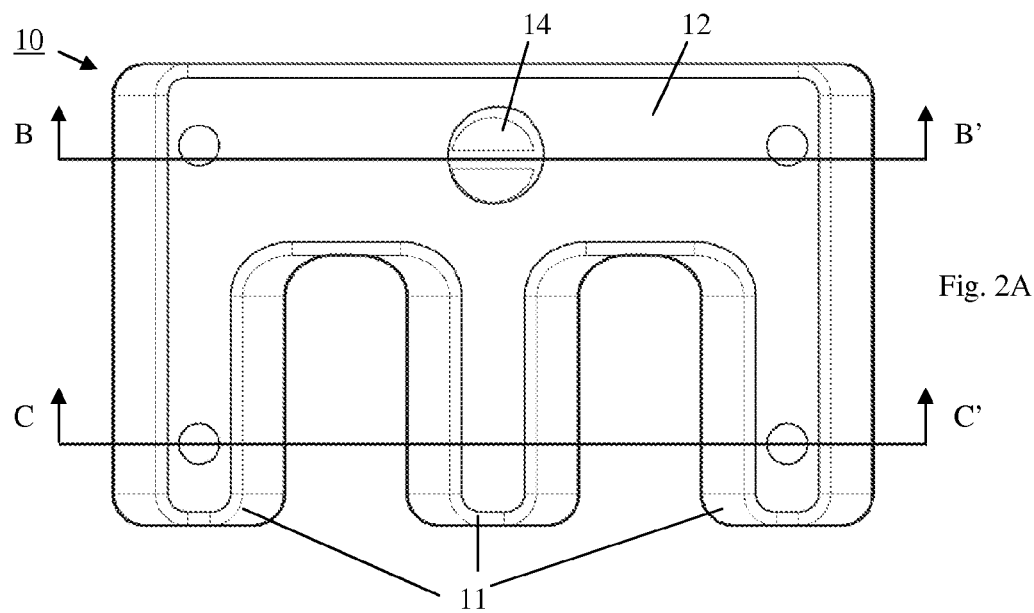
FIGS. 2A-2D illustrate the structure of the first hardware piece of the connector.
Figure 2B:
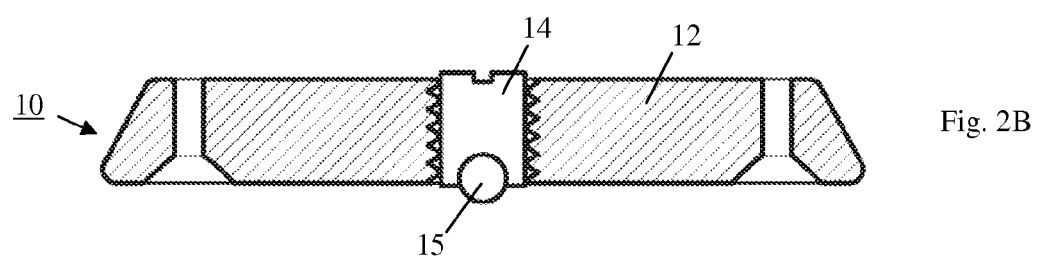
Figure 2C:
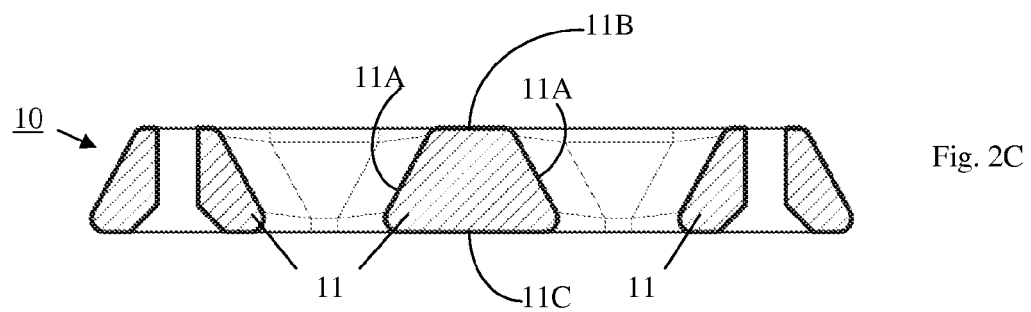
Figure 2D:
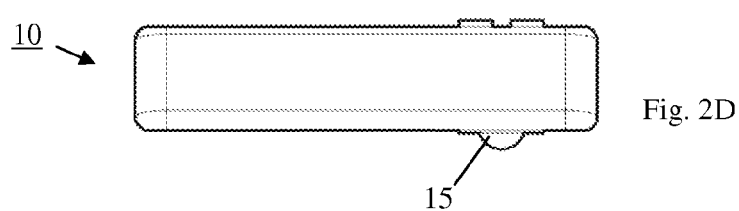

FIGS. 2A-2D illustrate the structure of the first hardware piece 10 (also referred to as the male hardware piece). FIG. 2A is a top plan view; FIGS. 2B and 2C are side cut-away views taken in planes indicated by lines B-B' and C-C' in FIG. 2A, respectively; and FIG. 2D is a side view from the right side of FIG. 2A. In the orientation shown in FIGS. 2B and 2C, the top furniture module is located above the hardware piece 10.

The first hardware piece 10 generally has a flat shape bound between two parallel planes. As shown in FIGS. 1A, 2A and 2C, the first hardware piece 10 has a number of dovetail shaped, elongated prongs (protruding members) 11. Any suitable number of prongs may be used, including one (three are shown in the figures). Each prong 11 has two angled sides 11A. The top face 11B of each prong 11, which will be in contact with the bottom surface of the top furniture module, are narrower than the bottom face 11C; i.e., the dovetail (trapezoidal) shape of the cross-section of the prong is narrower at the location where the prong is in contact with the furniture module. The prongs 11 are joined to a base part 12 of the first hardware piece 10, and extend in parallel with each other from the base part.

As shown in FIGS. 2A, 2B and 2D (see also FIG. 4A), the first hardware piece 10 also has a detent 14/15 facing downward, i.e. facing away from the surface of the furniture module 100 to which the first hardware piece is attached. The detent includes a ball 15 partially protruding from a casing 14, i.e. from the bottom surface (the surface not in contact with the furniture module) of the first hardware piece 10. An internal spring (not shown) disposed in the casing 14 urges the ball outward. The ball 15 may retract into the casing 14 under a force. The biasing force applied by the spring can be of any varying amount to provide different degrees of resistance. As explained later, the ball will fit into a track of the second hardware piece.

FIGS. 3A-3C illustrate the structure of the second hardware piece 20 (also referred to as the female hardware piece). FIG. 3A is a top view, and FIGS. 3B and 3C are side cut-away views taken in planes indicated by lines B-B' and C-C' in FIG. 3A, respectively. In the orientation shown in FIGS. 3B and 3C, the bottom furniture module is located below the hardware piece 20.

The second hardware piece 20 generally has a flat shape bound between two parallel planes. As shown in FIGS. 3A-3C, the second hardware piece 20 has a frame 21; a peripheral area 26 of the frame may form a flange to facilitate mounting of the hardware piece 20 to the furniture module. The frame 21 defines a main cavity 22 as well as a number of dovetail shaped, elongated slots (receiving cavities) 23. Each slot has two angled sidewalls 23A; the dovetail (trapezoidal) shape of the cross-section of the slots 23 is narrower at the top (the side facing away from the furniture module to which the hardware piece 20 is affixed). The slots 23 are separated by elongated protrusions 24 which are also dovetail shaped, being wider at the top. The slots 23 are joined to the main cavity 22, and extend in parallel with each other from the main cavity. Any suitable number of slots may be used, including one (three are shown in the figures). Preferably, the number of slots 23 in the second hardware piece 20 is the same as, or greater than, the number of prongs 11 in the first hardware piece 10.

As shown in FIGS. 1A-1B, the main cavity 22 and slots 23 of the second hardware piece 20 are designed to receive and accommodate the first hardware piece 10. As shown in FIG. 1B, the main cavity 22 of the second hardware piece is sufficiently sized to receive and accommodate the entire first hardware piece 10. The height of the main cavity 22 and slots 23 is approximately the same as the height of the first hardware piece 10, allowing for a suitable tolerance (gap) that should be as small as possible. Thus, when the first hardware piece 10 is received within the main cavity and the slots, the top surfaces of the two hardware pieces 10, 20 are flush with each other.

The cross-sectional shape and size of the slots 23 are approximately the same as the cross-sectional shape and size of the prongs 11, allowing for a suitable tolerance that should be as small as possible. In addition, the distances between the multiple prongs 11 and the distance between the multiple slots 23 are also approximately equal. As a result, the prongs 11 can fit into the slots 23 (see FIG. 1C), and can slide along the slots.

As shown in FIGS. 1A, 3A 3B, the second hardware piece 20 also includes a track or groove 25 formed on the bottom of the main cavity 22 and extending in the same direction as the slots 23, for receiving the ball 15 of the detent of the first hardware piece 10. The track 25 preferably has a depth that is about half of the diameter of the ball 15. The track 25 has at least two parts, 25A and 25B, the first part 25A being an elongated track and the second part 25B being a round indentation aligned with the first part 25A. In the location 25C between the first part 25A and the second part 25B, there may be a shallower track or no track; in other words, the location 25C constitutes a barrier between the two parts 25A and 25B. The barrier 25C has a suitable profile to generate a desired amount of resistance when the ball 15 moves from the track 25A to the round indentation 25B. The three parts 25A, 25B and 25C are aligned in the same line parallel to the direction of the slots 23.

When the first hardware piece 10 is received in the main cavity 22 of the second hardware piece 10 (see FIG. 1B), the ball 15 of the detent is located in the first part 25A of the track, as shown in FIG. 4B. From this state, referred to as the loading/unloading state, the first hardware piece 10 is slideable along the cavity 22 and slots 23 of the second hardware piece 20 to a state (referred to as the locked state, shown in FIG. 1C) where the prongs 11 of the first hardware piece are inserted into the slots 23 of the second hardware piece. During the movement from the loading/unloading state (FIGS. 1B and 4B) to the locked state (FIGS. 1C and 4C), the ball 15 first slides along the first part 25A of the track, then goes over the barrier 25C (shallower track or no track), and falls into the round indentation 25B when the first and second hardware pieces 10, 20 are in the locked state. The ball 15 retracts when it goes over the barrier section 25C.

The detent may be located at other alternative locations. For example, one or more detents may be located on side walls of the first hardware piece 10, including the side walls of the prongs 11, and corresponding one or more tracks may be located on side walls of the second hardware piece 20, including the side walls of the slots 23. Multiple detents and multiple corresponding tracks may be provided. Preferably, the barrier portion of each track should be positioned so that they are encountered at the same point of travel of the first hardware piece 20.

Alternatively, the detent may be provided on the second hardware piece 20 and the track may be provided on the first hardware piece 10.

In another alternative, the detent may be built as a part of the first hardware piece 10 using flexible plastic on the middle prong 11 to simulate the spring. The prong may be changed from its current trapezoidal shape to a plastic prong that is flexible at its base with a semi sphere at the end (to simulate the ball) and the appropriate indentations; the protrusions 24 on the hardware piece 20 function to secure a final locked position to create an equivalent to track 25. Such a modification made to the first hardware piece 10 can be made to work with the track that is shown in the FIG. 3A as well, without making any adjustments to the second hardware piece 20.

Detents are well known; while some examples are described above, any type of detent may be used, including those employing spiral springs or flexible plates. As used in this disclosure, the term detent mechanism broadly refers to a device for positioning and holding one mechanical part in relation to another in a manner such that the device can be released by force applied to one of the parts. In the locked state, the detent mechanism resists relative movement of the two furniture modules when an insufficient force is applied, and allows for relative movement when a sufficient force is applied but without requiring a manual trigger or release and without requiring the use of a tool. The detent mechanism includes two parts that engage with and cooperate with each other, one part being mounted on the first furniture module, the other part being mounted on the second furniture module. In the illustrated embodiment, the first part of the detent mechanism is a spring loaded ball 15 and the second part of the detent mechanism is the track 25, which engage with and cooperate with each other to hold the two furniture modules in the locked state.

The movement of the first and second hardware pieces 10, 20 described above is also shown in FIGS. 4A-4C. The hardware pieces 10 and 20 are shown in a side cross-sectional view in a plane as indicated by line A-A' in FIGS. 1A, 1B and 1C. FIGS. 4A-4C also show the top and bottom furniture modules 100 and 200, respectively, to which the hardware pieces 10 and 20 are respectively attached, e.g. by screws. The side profile of the track 25, including the first part 25A, second part 25B and the barrier portion 25C, is also illustrated. FIGS. 4A-4C generally correspond to FIGS. 1A-1C.

The use of the connector set is described with reference to FIGS. 1A-1C and 4A-4C.

In the unassembled state, shown in FIGS. 1A and 4A, the first and second hardware pieces 10 and 20 are respectfully mounted on the first and second furniture modules 100 and 200. Then, the user places the top furniture module 100 on top of the bottom furniture module 200 (as schematically shown by the arrow in FIG. 4A). The two furniture modules are aligned such that the first hardware piece 10 is received in the cavity 22 of the second hardware piece 20, as shown in FIGS. 1B and 4B, where the two hardware pieces are in the loading/unloading state. Preferably, in the loading/unloading state, the two furniture modules 100 and 200 are stable, i.e. the top furniture module 100 can balance over the bottom furniture module 200 without outside assistance. In the loading/unloading state, the ball 15 of the detent on the first hardware piece 10 is positioned in the first part 25A of the track 25 of the second hardware piece 20.

Then, the user pushes the top furniture module along the direction of the prongs 11 and the slots 23, which is also parallel to the direction of the track 25, as schematically shown by the arrow in FIG. 4B. For convenience, this direction, i.e. the direction of movement of the first hardware piece 10 in the transition from the loading/unloading state to the locked state, is referred to as the transition-locking direction. As a result, the prongs 11 are inserted into the slots 23, as shown in FIGS. 1C and 4C, and the ball 15 falls into the round indentation 25B in the locked state. Toward the end of the transition, when the ball 15 reaches the end of the first part 25A of the track, extra force is required to push the top module 100 so that the ball 15 moves over the barrier 25C and falls into the round indentation 25B. The two hardware pieces 10, 20 are now locked together, as will be explained in more detail below.

The transition-locking direction can be a front to back, back to front, left to right, or right to left motion from the user's perspective, depending on the design of the furniture modules.

In the locked state, the unit formed by the two furniture modules 100 and 200 is stable and secure, and sturdy against forces of normal use. Preferably, they are stable against upward forces, e.g., when the top furniture module 100 is picked up, the bottom furniture module 200 can be lifted as well due to the connection formed by the two hardware pieces 10 and 20. More specifically, the dovetailed slots 23 and prongs 11 can hold the two hardware pieces together against a separating force in the vertical direction, and thereby holding the two furniture modules together. As mentioned earlier, the hardware pieces 10 and 20 are securely affixed to the furniture modules 100, 200, e.g. by screws. The furniture unit is also stable against downward forces on the top module, as the two furniture pieces are directly pressed against each other.

Preferably, the furniture unit is stable against lateral forces applied to the top or bottom furniture modules during normal use. In the lateral direction perpendicular to the transition-locking direction, the hardware pieces 10 and 20 prevent any movement because the prongs 11 and are pressed against the side walls 23A of the slots 23. In the direction opposite the transition-locking direction, referred to as the transition-unlocking direction, the top module 100 is stable against movements as long as the lateral force is less than that required to move the ball 15 out of the indentation 25B over the barrier 25C. In the transition-locking direction, movement may be restrained by the configuration of the prongs 11 and slots 23. For example, the ends of the prongs 11 may press against the end walls of the slots 23 when the prongs are longer than or of equal length as the slots; or the ends of the protrusions 24 may press against the base 12 when the slots 23 are longer than or of equal length as the prongs 11. Alternatively, if in the locked state the movement is restrained by the configuration of the prongs 11 and slots 23 in the above-described manner, the top furniture module 100 is still stable against movements in the transition-locking direction as long as the lateral force is less than that required to move the ball 15 out of the indentation 25B.

When the two furniture modules 100 and 200 are assembled, they two modules are in contact with each other, and the hardware pieces 10 and 20 are essentially invisible from the outside. In addition, the two furniture modules are aligned as desired, for example, when the two modules are of the same size, the four sides of one module are flush with the corresponding sides of the connected module.

To disassemble the furniture unit, a sufficient force is applied to the top furniture module 100 in the transition-unlocking direction. As a result, the ball 15 is pushed out of the indentation 25B (by momentarily retracting into the casing of the detent), and goes over the barrier 25C to enter the track 25A, and moves along the track 25A. When the first and second hardware pieces 10 and 20 are in the loading/unloading state, the top furniture module 100 may be picked up and separated from the bottom furniture module 200.

As can be seen from the above descriptions, once the hardware pieces of the connector are mounted onto the respective furniture modules, the furniture modules can be assembled and disassembled without using any tools.

The hardware pieces 10 and 20 may be formed of plastic or other suitable materials, including hard metals. Preferably, the material is a hard material that does not change shape over time or due to temperature change, does not get chipped or worn down easily when repeatedly sliding against other pieces of the same material. It should also be hard enough to not snap as a result of movement of the furniture unit consisting of several modules as a whole.

The hardware pieces are formed separately from the furniture modules, and are mounted onto the furniture modules. In one preferred embodiment the screws for attaching the female and the male hardware pieces are 5⅝" #10 and 4¾" #6 screws, respectively. The number of screws is four and eight for the female and the male hardware pieces, respectively. Providing hardware pieces separately from the furniture modules is an advantage to establishing unified standards for modular furniture systems.

FIGS. 1A-1C and 4A-4C show one set of the connector hardware (including the male hardware piece and the female hardware piece), but two or more sets of the connector hardware may be provided to join two furniture modules together. Each furniture module may include one or more male hardware pieces or one or more female hardware pieces or both.

For example, multiple hardware pieces (male and/or female) may be provided on one surface of one furniture module, and the same number of hardware pieces of the opposite type may be provided on one surface of another furniture module, at corresponding locations according to how the two furniture modules are intended to be arranged in the furniture unit. This increases the strength of the connectors, making it more secure to join large or heavy modules together. It also enables the user to fit two or more smaller (less wide) units over one wider unit or vice versa. In one particular example, multiple hardware pieces are mounted at about 5" or 6" apart (other distances may be used as well).

In addition, each furniture module may include two or more hardware pieces (male and/or female) for joining to two or more other furniture modules. For example, a furniture module may have two hardware pieces on its bottom surface for connecting with another furniture module under it, and two hardware pieces on its top surface for connecting with yet another furniture module above it, forming a three-module unit; this may be repeated to form larger units.

Although in the illustrated embodiments the furniture modules are arranged vertically, one on top of another, the connectors can also be used to join furniture modules that are arranged side by side horizontally.

The connectors can be used to design modular furniture where the user can combine different modules in different customized configurations based on the user's need. For example, for a line of furniture modules, the distance between multiple hardware pieces on each module may be designed to be a constant, in order to increase the flexibility in the arrangements of different modules. Preferably, some surfaces of furniture modules have cavities pre-formed into them to accommodate the female hardware piece 20, and holes pre-drilled into them for screws for attaching the hardware pieces. The pre-formed cavities and holes help to correctly position and align the hardware pieces. In lieu of or in addition to pre-formed holes, markers may be used to help the user position the hardware pieces.

In the embodiments shown in FIGS. 1A-1C, 2A and 2C, the number of prongs 11 in the male hardware piece 10 is equal to the number of slots 23 in the female hardware piece 20. In alternative embodiments, the number of slots 23 in the female hardware piece 20 may be more than the number of prongs 11 in the male hardware piece 10. The set of prongs 11 can fit into any subset of adjoining slots 23, allowing the male hardware piece to be locked into different locking positions within the female hardware piece that are laterally displaced from each other. Multiple tracks 25 should be provided for each locking position. For example, if the male hardware piece has three prongs and the female hardware piece has five slots, there will be three different locking positions, and three different tracks should be provided. This design allows for adjustment of the relative positions of furniture modules, or adjustment of distances between connector pieces, without using more hardware pieces. This can allow more customizability and possibility to accommodate more possibilities for widths and depths of modules to fit into the system.

Although in the illustrated embodiment the height of the main cavity 21 of the second hardware piece 20 is identical to the thickness of the first hardware piece 10, the height of the main cavity may be larger than the thickness of the first hardware piece. In this situation, the detent including the ball 15 and the track 25 may be located on side walls of the first hardware piece 10 and the main cavity or slots of the second hardware piece.

Figure 5:
FIG. 5 schematically illustrates the cross-sectional shape of the prongs of the first hardware piece according to an alternative embodiment of the present invention.

In an alternative embodiment, the prongs 11 of the first hardware piece have a step-shaped cross section, as shown in FIG. 5, rather than a trapezoidal shape. The slots 23 of the second hardware piece have a matching cross-sectional shape. Other cross-sectional shapes may be used, as long as the top side of the cross-section is narrower than a middle portion of the cross-section, such that the prongs cannot fall out of the slots through the top opening of the slots. This way, when forces are applied to the first and second hardware pieces in the vertical direction, the prongs and the slots will remain engaged with each other without separating.

In another alternative embodiment, each slot 23 of the second hardware piece 20 is replaced by a tunnel. Unlike the slots 23, the tunnel has a closed top. The first hardware piece 10 is modified correspondingly, so that the prongs 11 have a smaller height than the base 12. In the locked state, the prongs 11 are inserted into the tunnels.

The connectors can be provided separately from the furniture modules. As mentioned earlier, the furniture modules may have cavities or markers pre-formed on them to facilitate the attachment of the connectors to the furniture module, but this is optional.

By providing the connector hardware separately of the furniture modules, the furniture modules may have more cavities or markers pre-formed on them as they have sets of connectors to provide even more permutations for customization and compatibility with other modules. Each of the multiple connectors can operate independently without interfering with the full functioning of other connectors. Because of this, it also makes available the possibilities of various apparatuses to work within the cavities or markers to have a more continuous spectrum of flexibility in terms of the spacing between connectors, instead of set multiples such as 5" or 6" as mentioned earlier.

Connectors according to embodiments of the present invention allow for a modular furniture system and simplify the connection process between two modules of furniture. The hardware seeks to provide a simple, inexpensive, straightforward and easy to understand/use system for consumers to rebuild furniture. The connector hardware is invisible in the assembled furniture units. The system is tool-free to operate once the connectors are mounted onto the furniture module, easy to learn, stable to move as one unit when assembled, and safe from outside force resulting from typical human interactions in all directions. It accommodates full-weight furniture designs made of a wide variety of materials, accommodates nearly any existing modern design with minimal design integrity compromise, provides all the functions of modularity, including customizability of functions, geometric patterns, color, design motifs, etc., without foregoing the form and function of traditional furniture and is not permanently affixed to the frame of the furniture at the time of manufacture to provide for more flexibility in manufacturing. The system can accommodate designs of all kinds of various different functionalities and aesthetics.

The applications of the connectors are not limited to modules of furniture; they can be used to joint other objects as well, such as planters, appliances, etc.

It will be apparent to those skilled in the art that various modification and variations can be made in the connector hardware of the present invention without departing from the spirit or scope of the invention. Thus, it is intended that the present invention cover modifications and variations that come within the scope of the appended claims and their equivalents.

What is claimed is:

1. A connector for joining two furniture modules or other objects, comprising:
    a first hardware piece;
    a second hardware piece having a main cavity for receiving the first hardware piece, wherein the first and second hardware pieces are in a loading/unloading state when the first hardware piece is received in the main cavity of the second hardware piece, the second hardware piece further having one or more receiving cavities connected to the main cavity for receiving at least a portion of the first hardware piece, wherein the first and second hardware pieces are in a locked state when the portion of the first hardware piece is received in the one or more receiving cavities of the second hardware piece, and wherein the first hardware piece is slidable within the second hardware piece to change between the loading/unloading state and the locked state; and
    a detent mechanism, including a first part disposed on a first one of the first and second hardware pieces and a second part disposed on a second one of the first and second hardware pieces, wherein the first and second parts of the detent mechanism engage with and cooperate with each other to hold the first and second hardware pieces in the locked state, and to allow the first and second hardware pieces to change from the locked state to the loading/unloading when a sufficient force is applied, wherein the first part of the detent mechanism comprises a detent member disposed inside a recess defined in a surface of the first one of the first and second hardware pieces and includes a protruding end that is urged by a resilient biasing member to partially protrude out of the surface of the first one of the first and second hardware pieces, wherein the second part of the detent mechanism includes a track formed in a surface of the second one of the first and second hardware pieces, wherein the track includes a first elongated indentation and an aligned second indentation separated by a barrier, wherein the surface of the first one of the first and second hardware pieces and the surface of the second one of the first and second hardware pieces are in contact with each other when the first and second hardware pieces are in the loading/unloading state and the locked state, and wherein when the first and second hardware pieces move between the loading/unloading state and the locked state, the protruding end of the first part of the detent mechanism moves along the first elongated indentation of the track and moves between the first elongated indentation of the track and the second indentation of the tract over the barrier, wherein the protruding end protrudes less from the surface of the first one of the first and second hardware pieces when it moves over the barrier, and wherein when the first and second hardware pieces are in the locked state, the protruding end is located in the second indentation.

2. The connector of claim 1, wherein the first hardware piece has a base and one or more protruding members extending from the base, wherein the one or more protruding members are received in the one or more receiving cavities of the second hardware piece when the first and second hardware pieces are in the locked state, and the one or more protruding members slide along the one or more receiving cavities of the second hardware piece when the first and second hardware pieces move between the loading/unloading state and the locked state.

3. The connector of claim 2, wherein the protruding members of the first hardware piece are elongated prongs, each prong having a cross-sectional shape where a top side of the cross-sectional shape is narrower than a middle or bottom portion of the cross-sectional shape, and
wherein the receiving cavities are elongated slots, each slot having a cross-sectional shape that matches the cross-sectional shape of the prong it receives.

4. The connector of claim 3, wherein the cross-sectional shape of each elongated prong is a trapezoidal shape, a top side of the trapezoidal shape being narrower than a bottom side of the trapezoidal shape.

5. The connector of claim 1, wherein the first hardware piece has a flat top surface and the second hardware piece has a flat top surface, wherein the main cavity of the second hardware piece is open to the flat top surface of the second hardware piece,
wherein when the first and second hardware pieces are in the loading/unloading state, the first hardware piece is entirely received in the main cavity of the second hardware piece and the top surface of the first hardware piece is parallel to the top surface of the second hardware piece,
wherein when the first and second hardware pieces move relative to each other between the loading/unloading state and the locked state, the first hardware piece slide within the second hardware piece in a direction parallel to the top surfaces of the first and second hardware pieces, and
wherein when the first and second hardware pieces are in the locked state, the portion of the first hardware piece and the one or more receiving cavities of the second hardware piece engage each other to prevent the first and second hardware pieces from separating in a direction perpendicular to the top surfaces of the first and second hardware pieces.

6. The connector of claim 1, wherein the first part of the detent mechanism comprises a ball forming the protruding end and the resilient biasing member comprises a spring applying a biasing force on the ball, and wherein second indentation of the track is a round indentation.

7. A modular furniture system, comprising:
a first furniture module;
a second furniture module;
a first hardware piece mounted on a surface of the first furniture module and protruding from the surface of the first furniture module;
a second hardware piece mounted on a surface of the second furniture module, the second hardware piece being disposed in a mounting cavity in the surface of the second furniture module, the second hardware piece having one or more cavities for receiving the first hardware piece,
wherein the surface of the first hardware module is in contact with the surface of the second furniture module, wherein the first hardware piece is located within the cavities of the second hardware piece, and wherein the first and second hardware pieces engage with each other in a locked state to prevent the first and second furniture modules from separating in a direction perpendicular to the surface of the first furniture module and the surface of the second furniture module,
wherein the first and second hardware pieces are moveable from the locked state to a loading/unloading state by moving the first and second furniture modules relative to each other, and wherein in the loading/unloading state, the first and second hardware pieces allow the first and second furniture modules to separate in the direction perpendicular to the surface of the first furniture module and the surface of the second furniture module, and
a detent mechanism, including a first part disposed on a first one of the first and second hardware pieces and a second part disposed on a second one of the first and second hardware pieces, wherein the first and second parts of the detent mechanism engage with and cooperate with each other to hold the first and second hardware pieces in the locked state, and to allow the first and second hardware pieces to change from the locked state to the loading/unloading when a sufficient force is applied,
wherein the first part of the detent mechanism comprises a detent member disposed inside a recess defined in a surface of the first one of the first and second hardware pieces and includes a protruding end that is urged by a resilient biasing member to partially protrude out of the surface of the first one of the first and second hardware pieces,
wherein the second part of the detent mechanism includes a track formed in a surface of the second one of the first and second hardware pieces, wherein the track includes a first elongated indentation and an aligned second indentation separated by a barrier, wherein the surface of the first one of the first and second hardware pieces and the surface of the second one of the first and second hardware pieces are in contact with each other when the first and second hardware pieces are in the loading/unloading state and the locked state, and wherein when the first and second hardware pieces move between the loading/unloading state and the locked state, the protruding end of the first part of the detent mechanism moves along the first elongated indentation of the track and moves between the first elongated indentation of the track and the second indentation of the tract over the barrier, wherein the protruding end protrudes less from the surface of the first one of the first and second hardware pieces when it moves over the barrier, and wherein when the first and second hardware pieces are in the locked state, the protruding end is located in the second indentation.

8. The modular furniture system of claim 7,
wherein the one or more cavities of the second hardware piece includes a main cavity for receiving the first hardware piece, wherein the first and second hardware pieces are in the loading/unloading state when the first hardware piece is received in the main cavity, wherein the second hardware piece further has one or more receiving cavities connected to the main cavity for receiving at least a portion of the first hardware piece, wherein the first and second hardware pieces are in the locked state when the portion of the first hardware piece is received in the one or more receiving cavities, and wherein the first hardware piece is slidable within the second hardware piece to change between the loading/unloading state and the locked state.

9. The modular furniture system of claim 8, wherein the first hardware piece has a base and one or more protruding members extending from the base, wherein the one or more protruding members are received in the one or more receiving cavities of the second hardware piece when the first and second hardware pieces are in the locked state, and the one or more protruding members slide along the one or more receiving cavities of the second hardware piece when the first and second hardware pieces move between the loading/unloading state and the locked state.

10. The modular furniture system of claim 9, wherein the protruding members of the first hardware piece are elongated prongs, each prong having a cross-sectional shape where a top side of the cross-sectional shape is narrower than a middle or bottom portion of the cross-sectional shape, and wherein the receiving cavities are elongated slots, each slot having a cross-sectional shape that matches the cross-sectional shape of the prong it receives.

11. The modular furniture system of claim 10, wherein the cross-sectional shape of each elongated prong is a trapezoidal shape, a top side of the trapezoidal shape being narrower than a bottom side of the trapezoidal shape.

12. The modular furniture system of claim 7, wherein the first hardware piece has a flat top surface in contact with the surface of the first furniture module, the second hardware piece has a flat top surface flush with the surface of the second furniture module, wherein the main cavity of the second hardware piece is open to the flat top surface of the second hardware piece.

13. The modular furniture system of claim 7, wherein the first furniture module and/or the second furniture module are provided with a plurality of pre-formed mounting cavities on one or more of their surfaces, each mounting cavity being shaped for receiving a second hardware piece.

14. The modular furniture system of claim 7, comprising a plurality of first hardware pieces mounted on the surface of the first furniture module and a corresponding plurality of second hardware pieces mounted on the surface of the second furniture module.

15. The modular furniture system of claim 7, wherein the first part of the detent mechanism comprises a ball forming the protruding end and the resilient biasing member comprises a spring applying a biasing force on the ball, and wherein second indentation of the track is a round indentation.

* * * * *